United States Patent
Shi et al.

(10) Patent No.: US 8,259,876 B2
(45) Date of Patent: Sep. 4, 2012

(54) SYSTEM AND METHOD FOR TUNING A RADIO RECEIVER

(75) Inventors: Ying Shi, Coralville, IA (US); Bryan J. Roll, Marion, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 1015 days.

(21) Appl. No.: 12/052,765

(22) Filed: Mar. 21, 2008

(65) Prior Publication Data

US 2009/0238312 A1 Sep. 24, 2009

(51) Int. Cl.
*H04L 27/06* (2006.01)

(52) U.S. Cl. ................ 375/344; 455/182.2

(58) Field of Classification Search ............ 375/344; 455/182.2, 183.1, 131, 234.1, 343.1, 319
See application file for complete search history.

(56) References Cited

U.S. PATENT DOCUMENTS

| | | | |
|---|---|---|---|
| 4,955,075 A * | 9/1990 | Anderson | 455/182.2 |
| 5,335,364 A | 8/1994 | Heinonen | |
| 5,446,411 A | 8/1995 | Horsfall et al. | |
| 5,818,302 A * | 10/1998 | Otsuka et al. | 331/17 |
| 6,366,769 B1 | 4/2002 | Vaucher et al. | |
| 6,591,093 B1 * | 7/2003 | Coffing et al. | 455/319 |
| 6,847,688 B1 * | 1/2005 | Molnar et al. | 375/344 |
| 2003/0181182 A1 | 9/2003 | Hoi | |
| 2004/0203396 A1 | 10/2004 | Black et al. | |
| 2004/0214538 A1 | 10/2004 | Ballantyne et al. | |
| 2008/0039042 A1 * | 2/2008 | Ciccarelli et al. | 455/234.1 |

* cited by examiner

*Primary Examiner* — Leon-Viet Nguyen
(74) *Attorney, Agent, or Firm* — Knobbe Martens Olson & Bear, LLP (57) ABSTRACT

A system for tuning a radio receiver includes a radio receiver configured to provide a downconverted digital error signal, a digital synthesizer circuit configured to generate a first local oscillator control signal, a digital automatic frequency control (AFC) circuit configured to generate a second local oscillator control signal, wherein the digital synthesizer circuit is enabled to generate the first local oscillator control signal when the digital AFC circuit is disabled, the first local oscillator control signal corresponds to an estimate of a desired local oscillator frequency, the digital AFC circuit is enabled to generate the second local oscillator control signal when the digital synthesizer circuit is disabled and the second local oscillator control signal corresponds to the desired local oscillator frequency.

21 Claims, 4 Drawing Sheets

SYSTEM AND METHOD FOR TUNING A RADIO RECEIVER

BACKGROUND

Portable communication devices, such as cellular telephones, personal digital assistants (PDAs) and other communication devices often include multiple radio receivers or transceivers. For example, a cellular telephone may include a cellular transceiver, a television receiver and an FM radio. To minimize power consumption of an FM radio in handset applications, cell phone manufacturers have specified the use of a low frequency crystal, such as a 32.768 kHz crystal oscillator, as the external reference frequency source for the latest generation of FM radio integrated circuit (IC). The 32.768 kHz reference frequency must be multiplied many times to generate a local oscillator (LO) signal that enables the receiver to tune to channels in the FM frequency range of 76 to 108 MHz.

Implementing a low frequency reference source causes many design challenges. One of the challenges is that the frequency noise and frequency error of the low frequency (32.768 kHz in this example) reference are multiplied up by a large factor in the frequency synthesizer, resulting in large frequency error and frequency noise in the LO signal. For example, the multiplication factor for a 32.768 kHz reference source is about 3125 when the LO frequency is 102.4 MHz. The frequency error and frequency noise in the LO signal can degrade receiver selectivity and signal-to-noise-ratio (SNR), respectively, which are two key metrics of the performance of an FM receiver. It should be noted that in other radio frequency (RF) systems with higher LO frequencies, the problem will be worse if the same low frequency reference is used. For example, in a Bluetooth radio system where the LO frequency is about 2.48 GHz, the multiplication factor would be 75680 if a 32.768 kHz frequency reference source were used.

One way to avoid the large multiplication of frequency noise and error is to control the LO frequency through an automatic frequency control (AFC) circuit instead of a frequency synthesizer. While both a synthesizer and an AFC circuit have been used in the past, previous implementations of synthesizers and AFC circuits are analog intensive and require external components.

One previous analog methodology of implementing the synthesizer and the AFC circuit suffers from transients and spikes when switching from the synthesizer circuit to the AFC circuit, due to the analog nature of the circuits. Another drawback is that a large capacitance is used and cannot be easily integrated in the IC and therefore requires the use of external components.

Another previous analog methodology of implementing the frequency synthesizer and the AFC circuit uses a phase-and-frequency detector (PFD), a charge pump and a loop filter. A voltage controlled oscillator (VCO) tuning signal in the synthesizer and a VCO tuning signal in the AFC are both analog signals. The disadvantages of this implementation are that a large capacitance is used and cannot be easily integrated in the IC and therefore requires the use of external components.

Further, an analog adder may add more noise or consume more power, and, in the AFC mode even though the synthesizer does not affect the AFC operation as long as the frequency is within certain window, it nevertheless consumes extra power.

Therefore, it would be desirable to have a radio frequency (RF) tuning system and method that can be applied to an FM radio, or any RF receiver, that overcomes these challenges.

SUMMARY

Embodiments of a system for tuning a radio receiver include a radio receiver configured to provide a downconverted digital error signal, a digital synthesizer circuit configured to generate a first local oscillator control signal, a digital automatic frequency control (AFC) circuit configured to generate a second local oscillator control signal, wherein the digital synthesizer circuit is enabled to generate the first local oscillator control signal when the digital AFC circuit is disabled, the first local oscillator control signal corresponds to an estimate of a desired local oscillator frequency, the digital AFC circuit is enabled to generate the second local oscillator control signal when the digital synthesizer circuit is disabled and the second local oscillator control signal corresponds to the desired local oscillator frequency.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Although described with particular reference to a portable transceiver incorporating an FM radio receiver, the system and method for tuning a radio receiver can be implemented in any receiver in which it is desirable to tune to a particular radio frequency (RF) carrier signal, associated with a desired frequency.

The system and method for tuning a radio receiver uses both a synthesizer and an automatic frequency control (AFC) circuit, both substantially implemented in the digital domain, to generate a local oscillator (LO) signal from a relatively low frequency reference source. The LO signal is used to downconvert the received radio frequency (RF) signal.

The system and method for tuning a radio receiver can be implemented in hardware, software, or a combination of hardware and software. When implemented in hardware, the system and method for tuning a radio receiver can be implemented using specialized hardware elements and logic. When the system and method for tuning a radio receiver is implemented partially in software, the software portion can be used to precisely control the various components in a synthesizer and an AFC circuit. The software can be stored in a memory and executed by a suitable instruction execution system (microprocessor). The hardware implementation of the system and method for tuning a radio receiver can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for tuning a radio receiver comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 1:
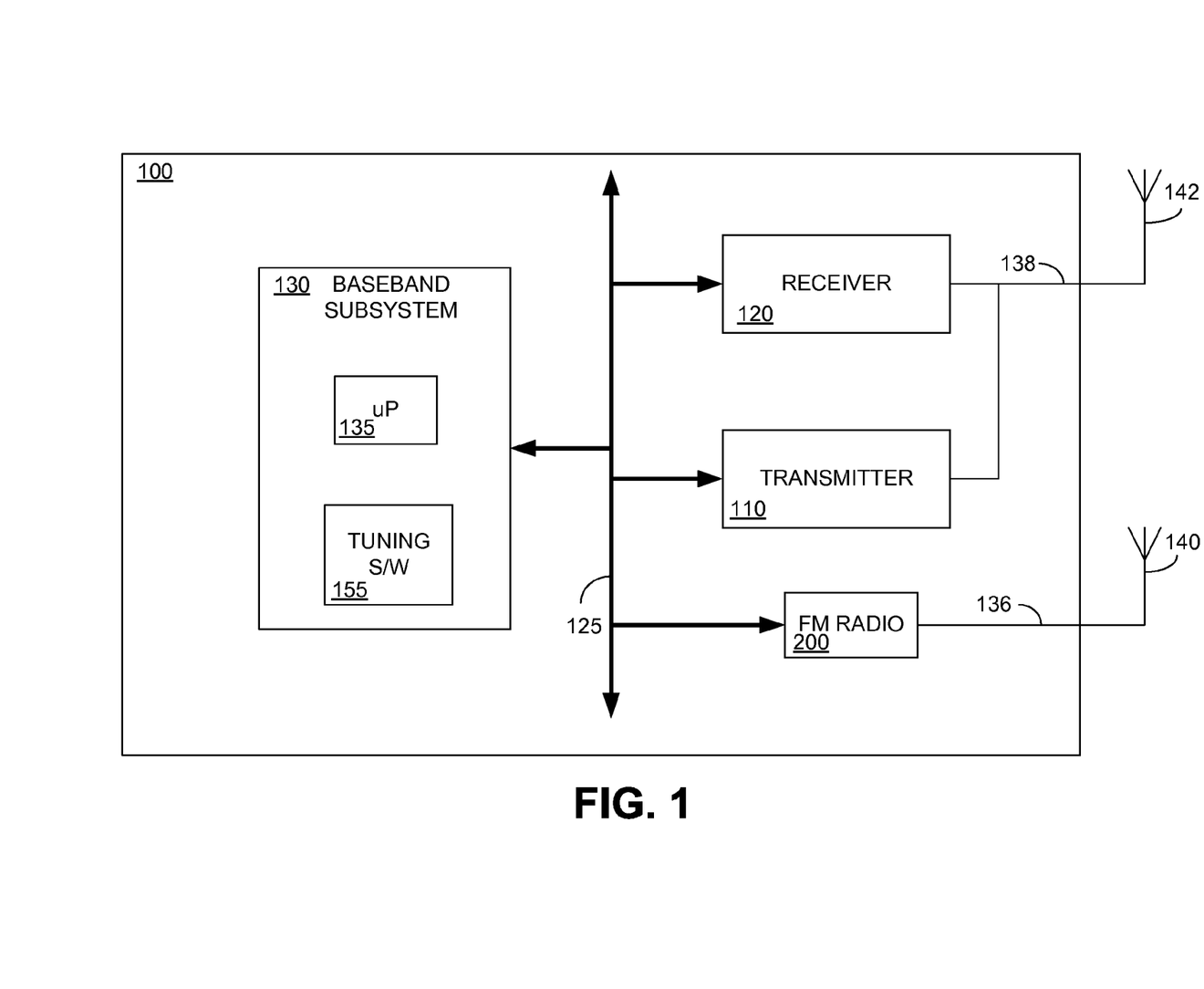
FIG. 1 is a block diagram illustrating a simplified portable transceiver.

FIG. 1 is a block diagram illustrating a simplified portable transceiver 100. Embodiments of the system and method for tuning a radio receiver can be implemented in any radio receiver, and in this example, are implemented in an FM radio receiver. The portable transceiver 100 illustrated in FIG. 1 is intended to be a simplified example and to illustrate one of many possible applications in which the system and method for tuning a radio receiver can be implemented. One having ordinary skill in the art will understand the operation of a portable transceiver. The portable transceiver 100 includes a transmitter 110, a receiver 120, and a baseband module 130 connected over a communication bus 125. The portable transceiver 100 also includes an FM radio receiver 200. The receiver 120 and transmitter 110 are connected to antenna 142 over connection 138. The FM radio receiver 200 is connected to an antenna 140 over connection 136 so that the FM radio receiver 200 may receive FM broadcast radio signals. If portions of the system and method for tuning a radio receiver are implemented in software, then the baseband module 130 also includes tuning software 155 that can be executed by a microprocessor 135, or by another processor, to control the operation of the system and method for tuning a radio receiver to be described below.

Figure 2:
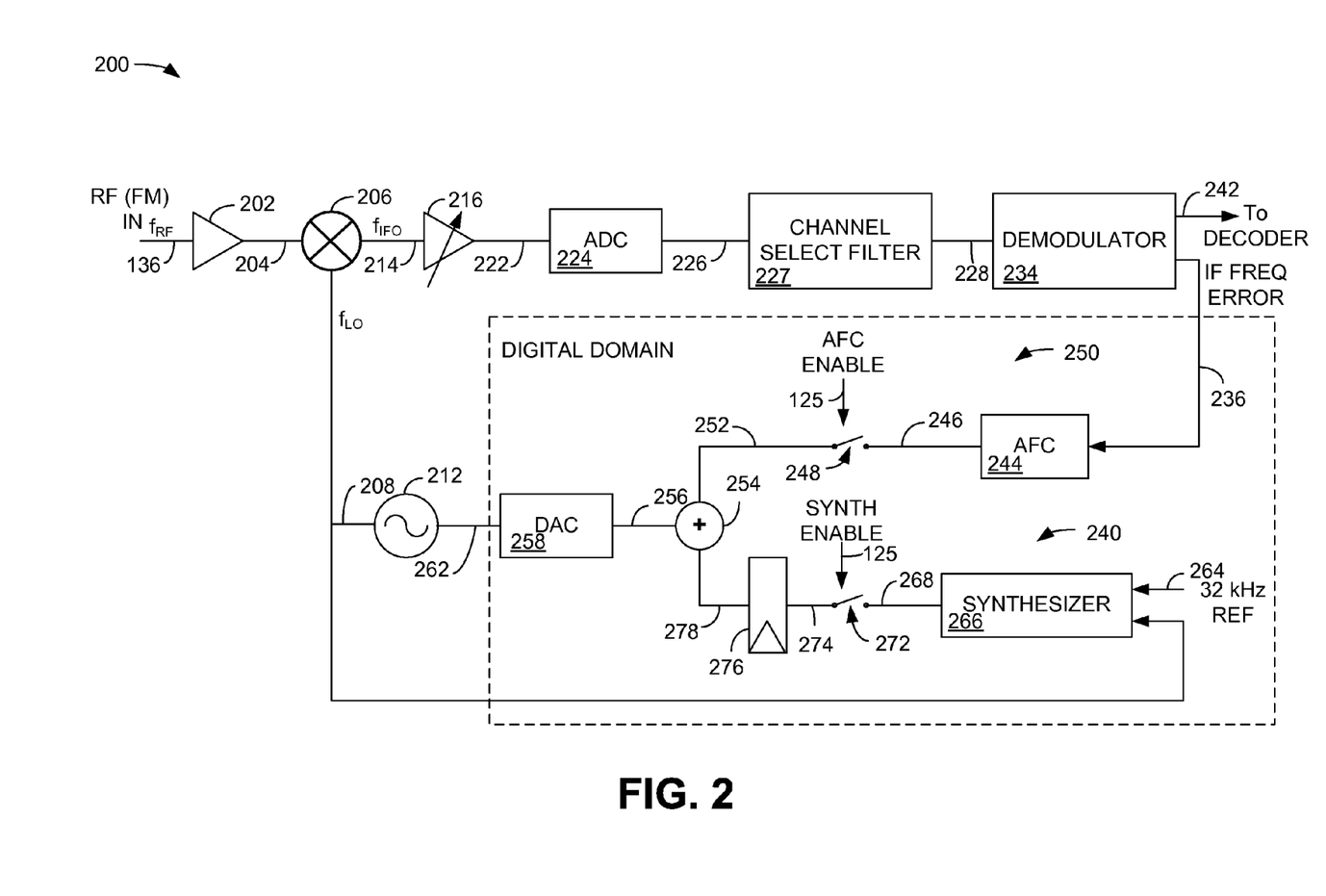
FIG. 2 is a simplified schematic diagram illustrating an embodiment of an FM radio in which the system and method for tuning a radio receiver can be implemented.

FIG. 2 is a simplified schematic diagram illustrating an embodiment of the FM radio receiver 200 shown in FIG. 1 in which the system and method for tuning a radio receiver can be implemented. Only the portions of an FM radio receiver that are relevant to the explanation of the system and method for tuning a radio receiver are shown. The block diagram shown in FIG. 2 is a generic, simplified version of an FM radio receiver. The actual implementation of the FM radio receiver can be more complicated and can comprise functional blocks in addition to the functional blocks shown in FIG. 2. The FM radio receiver architecture can also differ from that shown in FIG. 2. The signals shown in FIG. 2 can also be either real signals or complex signals. In the case of complex signals, the signal paths can include an in-phase (I) path and a quadrature-phase (Q) path. Accordingly, the system and method for tuning a radio receiver, to be described below, can employ a real filter, a complex filter, or a combination of real and complex filters. In all cases, the system and method for tuning a radio receiver is applicable regardless of the actual architecture and the types of signals. The FM radio receiver 200 includes a low noise amplifier (LNA) 202, which receives a radio frequency (RF) signal over connection 136. In this example, the signal received over connection 136 is an FM radio input signal from the antenna 140 (FIG. 1).

The output of the LNA 202 on connection 204 is supplied to a mixer 206. The mixer 206 receives a reference signal, also referred to as a local oscillator (LO) signal, via connection 208. The LO signal, referred to as $f_{LO}$, is supplied by an oscillator 212. The LO signal on connection 208 can also obtained by dividing the output of the oscillator 212 to the desired LO frequency. In an embodiment, the oscillator 212 can be a voltage controlled oscillator (VCO). To tune the radio to the desired channel, referred to as $f_{RF}$, the frequency of the LO signal, $f_{LO}$, is set at:

$$f_{LO} = f_{RF} \pm f_{IF0} \qquad \text{Eq. (1)}$$

where $f_{IF0}$ is the target intermediate frequency (IF), and the "+" and the "−" operators represent high side injection and low side injection, respectively. The choice of value of $f_{IF0}$ is a trade-off between image rejection and channel selectivity, as known in the art.

The mixer 206 downconverts the RF signal into an intermediate frequency (IF) signal on connection 214. The IF signal on connection 214 has a center frequency equal to the target IF frequency, $f_{IF0}$, when the LO signal is set to the desired LO frequency according to equation (1). The IF signal on connection 214 is supplied to an IF amplifier 216. The IF amplifier 216 may be implemented as a series of IF amplifiers and is shown as a single amplifier for simplicity. The IF amplifier 216 amplifies the signal on connection 214 and supplies the amplified IF signal on connection 222. The gain of the IF amplifier 216 is controlled by an automatic-gain-control (AGC) circuit (not shown). The amplified IF signal on connection 222 is supplied to an analog to digital converter (ADC) 224.

The ADC 224 converts the analog IF signal on connection 222 to a digital signal on connection 226. The digital IF signal on connection 226 is then supplied to a channel select filter 227. In an embodiment, the channel select filter 227 can be a switchable bandwidth bandpass filter as described in co-pending U.S. patent application Ser. No. 11/681,211 entitled "System And Method For Adjacent Channel Power Detection And Dynamic Bandwidth Filter Control, filed on Mar. 2, 2007, and which is hereby incorporated in its entirety into this document by reference. The frequency response of the channel select filter 227 is centered at the target IF frequency, $f_{IF0}$, and has sharp roll-off to provide sufficient selectivity by removing substantially all of the power in channels other than the power in the desired channel.

The output of the channel select filter 227 is supplied via connection 228 to a demodulator 234. In an embodiment of the FM radio 200, the demodulator 234 is implemented as a phase-locked-loop (PLL) demodulator. However, other demodulator implementations are possible. The demodulator 234 extracts the baseband information from the IF signal output of the channel select filter 227 and supplies a baseband signal output via connection 242. The signal on connection 242 can be supplied to a stereo decoder (not shown), followed by a digital to analog converter (DAC) (not shown) to convert the signal on connection 242 to an analog audio signal. The analog audio signal is then supplied to appropriate processing elements within the portable transceiver 100, so that FM radio information can be provided to a user.

In an embodiment of the system and method for tuning a radio receiver, the demodulator 234 also provides an IF frequency error signal over connection 236. The IF frequency error signal on connection 236 represents a measure of the magnitude by which the center frequency of the IF signal on connection 214 differs from the target IF frequency $f_{IF0}$. The IF frequency error results from the LO frequency error, and, as such, it is also a measure of the LO error.

The FM radio 200 also includes a synthesizer circuit 240 and an automatic frequency control (AFC) circuit 250, which are implemented substantially in the digital domain. The synthesizer circuit 240 includes a synthesizer 266. The synthesizer 266 receives a relatively low frequency reference source over connection 264. In this example, the low frequency reference source is a 32.768 kHz signal, nominally referred to as a 32 kHz reference signal. However, the system and method for tuning a radio receiver can be implemented using frequency reference sources other than 32.768 kHz. The system and method for tuning a radio receiver can be useful in any receiver application in which a relatively low frequency reference source is multiplied many times to the desired LO frequency. In the example illustrated here, the multiplication factor is about 3125 when the LO frequency is 102.4 MHz, which would contribute significant frequency error and noise if conventionally multiplied. The frequency error and frequency noise in the LO signal can degrade receiver selectivity and signal-to-noise-ratio (SNR). The synthesizer 266 also receives the LO signal output of the oscillator 212 over connection 208.

The output of the synthesizer 266 can be referred to as a first local oscillator control signal and is provided over connection 268 to a switch 272. The switch 272 is controlled by a "synthesizer enable" signal supplied over connection 125, which can be generated from within the integrated circuit (IC) on which the FM radio 200 is fabricated or by the baseband subsystem 130. The synthesizer enable signal will be described further below. The output of the switch 272 is provided over connection 274 to a register 276. The register 276 stores the state of the synthesizer 266 at the end of the synthesizer tuning cycle, as will be described below.

The output of the register 276 is provided over connection 278 to an adder 254. The adder 254 combines the output of the synthesizer circuit 240 and the AFC circuit 250, and provides a combined output over connection 256. The output of the adder 254 is used to determine an output of a digital-to-analog converter (DAC) 258. The output of the DAC 258 on connection 262 is referred to as the VCO tune line, and controls the frequency of the oscillator 212.

The AFC circuit 250 includes an AFC element 244, which receives the IF frequency error signal over connection 236. The AFC element 244 integrates the IF frequency error signal and generates a tuning signal on connection 246. The tuning signal on connection 246 can be referred to as a second local oscillator control signal and is supplied to a switch 248. The switch 248 is controlled by an "AFC enable" signal supplied over connection 125, which can be generated from within the integrated circuit (IC) on which the FM radio 200 is fabricated or by the baseband subsystem 130. The AFC enable signal will be described further below. The output of the switch 248 is provided over connection 252 to the adder 254. The output of the adder 254 is a combined local oscillator control signal that includes the first and second local oscillator control signals and is used to determine an output of a digital-to-analog converter (DAC) 258, as described above. The output of the DAC 258 is an analog tuning voltage that controls the frequency of the oscillator 212, thereby determining the frequency of the LO signal on connection 208.

In an embodiment, to tune the oscillator 212 to the desired LO frequency, the synthesizer circuit 240 is enabled via the switch 272, while the AFC circuit is disabled via the switch 248. After the synthesizer 266 tunes to a frequency in close proximity to the desired LO frequency, the switch 272 is controlled to disable the synthesizer circuit 240, while the switch 248 is controlled to enable the AFC circuit 250. The AFC element 244 then uses the IF frequency error signal on connection 236 to precisely tune to the desired LO frequency.

In accordance with an embodiment, the system and method for tuning a radio receiver is particularly well suited for an FM radio architecture, such as that shown in FIG. 2, where the IF signal is digitized, the channel select filter 227 and demodulator 234 are both implemented in the digital domain, and the IF frequency error on connection 236 is available in digital format. As described above, both the synthesizer circuit 240 and the AFC circuit 250 are implemented largely in the digital domain. Further, the synthesizer circuit 240 and the AFC circuit 250 share the same DAC 258, the output of which is the VCO tune line on connection 262.

In accordance with an embodiment of the system and method for tuning a radio receiver, tuning the LO frequency output of the oscillator 212 is fundamentally a two-step process. The first tuning step occurs through the synthesizer circuit 240. The synthesizer 266 compares the oscillator frequency on connection 208 against the 32.768 kHz reference source on connection 264 and quickly sets the frequency of the oscillator 212 to a frequency that is close to the desired LO frequency. The feedback loop formed by the AFC circuit 250 is open during synthesizer LO frequency tuning.

The second tuning step uses the AFC circuitry 250. After the synthesizer circuit 240 completes its tuning operation, substantial portions of the synthesizer circuit 240 are disabled and the AFC circuit 250 is enabled. For example, only a frequency detector (302 in FIG. 3) remains operational while the remainder of the elements in the synthesizer 266 are disabled. The AFC circuit 250 tunes the oscillator 212 to the exact frequency, as will be described below.

Figure 3:
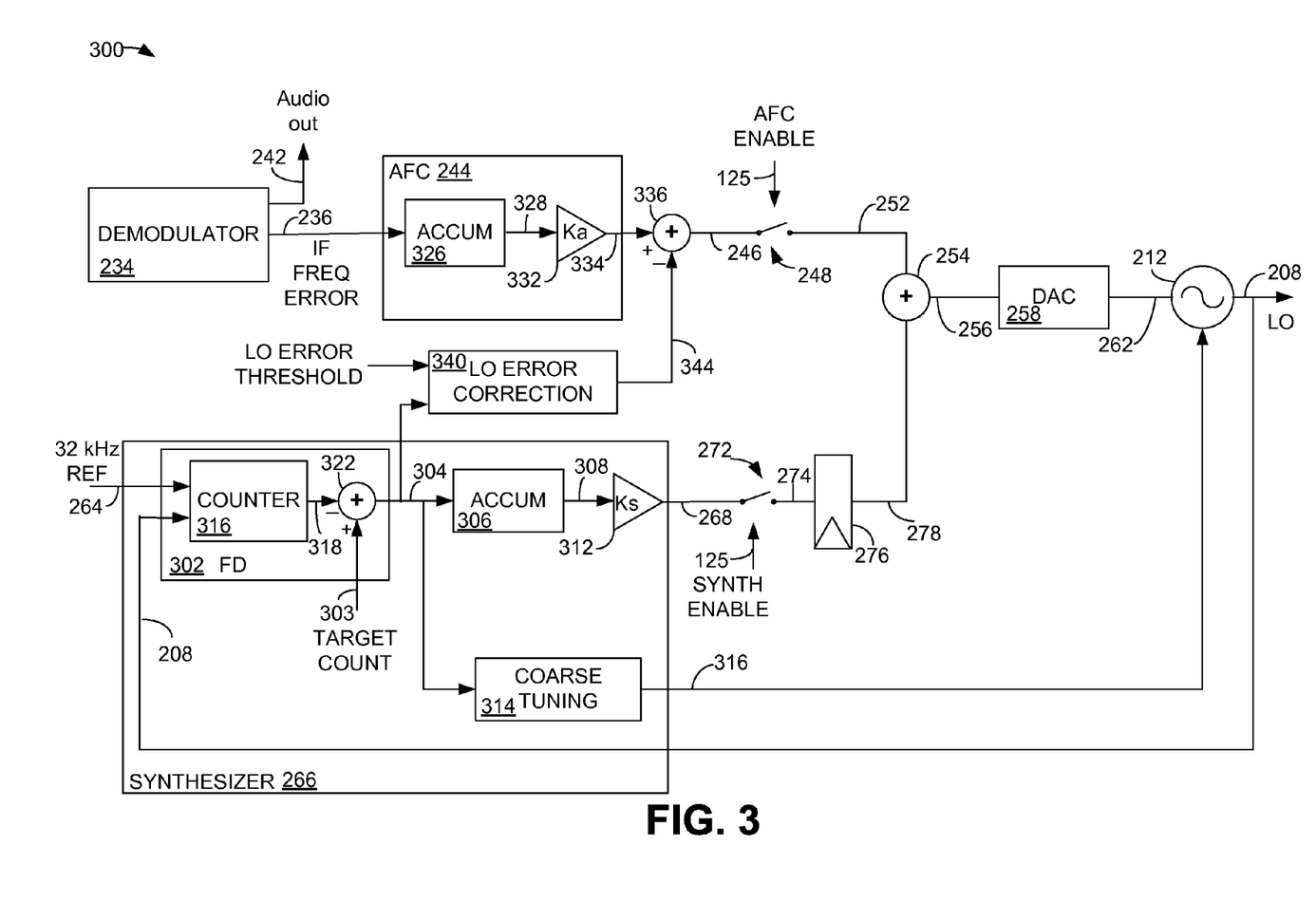
FIG. 3 is a schematic diagram illustrating the synthesizer and automatic frequency control (AFC) circuitry of FIG. 2.

FIG. 3 is a schematic diagram illustrating the synthesizer circuit and the automatic frequency control (AFC) circuit of FIG. 2. The diagram 300 includes a description of the AFC element 244, the synthesizer 266, and a local oscillator (LO) error correction element 340. The AFC element 244 includes a digital accumulator 326 and an amplifier 332. The digital accumulator 326 receives and accumulates the digital samples corresponding to the IF frequency error signal supplied from the demodulator 234 over connection 236. The amplifier 332 applies a scaling factor, referred to as "Ka," which sets the time constant of the AFC circuit 240 and supplies an output over connection 334 to an adder 336.

The synthesizer 266 includes a frequency detector (FD) 302, a digital accumulator 306, an amplifier 312 and a coarse tuning element 314. The frequency detector 302 includes a counter 316 and an arithmetic operator, implemented as an adder 322. The frequency detector 302 is used during both coarse tuning and fine tuning of the VCO 212. The counter 316 within the frequency detector 302 receives the frequency reference source over connection 264 and the output of the oscillator 212 over connection 208. The counter 316 counts the number of LO cycles for a pre-determined time duration set according to the frequency reference source. A target count value is supplied to the adder 322 over connection 303. The count result from the counter 316 is subtracted from the target count value supplied over connection 303. The target count value represents what the count result should be if the LO frequency was exactly at its target frequency. The output of the adder 322 represents the LO frequency error, which is supplied over connection 304 to the digital accumulator 306. The digital accumulator 306 receives and accumulates the digital samples corresponding to the output of the frequency detector 302 over connection 304. The digital accumulator 306 eliminates large capacitors that would otherwise require the use of external components. The amplifier 312 applies a scaling factor, referred to as "Ks," which sets the time constant of the synthesizer circuit 250, and supplies an output over connection 268 to the switch 272.

The synthesizer tuning performs a coarse tuning step and a fine tuning step. The coarse tuning element 314 eliminates the large variations in the VCO frequency due to manufacturing variations. The coarse tuning element 314 has a large tuning range but relatively low resolution. Fine tuning uses a smaller tuning range but uses higher resolution. Coarse tuning is realized by switching in or out banks of switched capacitors (not shown) inside the VCO 212. Fine tuning is performed through the synthesizer feedback loop (via connection 208) which controls the tuning voltage for a varactor (not shown) inside the VCO. A synthesizer including coarse tuning and fine tuning is known in the art.

In accordance with an embodiment of the system and method for tuning a radio receiver, the synthesizer 266 sets the oscillator frequency on connection 208 close to, but not exactly at, the target frequency. Therefore, the implementation of the synthesizer 266 can be greatly simplified. The synthesizer 266 is substantially simpler than a conventional synthesizer. The synthesizer 266 is a frequency locked loop (FLL), where the counter-based frequency detector 302 is used for both coarse tuning and fine tuning. This is possible because of the relaxed requirement for the synthesizer resolution in this embodiment. In the past, the fine tuning required an analog based phase-frequency detector (PFD) because of the analog nature of the fine tuning in which a synthesizer set the VCO frequency to the exact target. However, because the IF frequency error signal on connection 236 (FIG. 2) is available in digital form, a simplified implementation is possible, as described herein.

In the AFC circuit 244, the IF frequency error information is readily provided in digital form by an integrator (not shown) inside the demodulator 234. The demodulator 234 is a type-II phase-locked loop (PLL) demodulator. Other implementations of the demodulator are possible. The IF frequency error on connection 236 is accumulated in the digital accumulator 326, and converted to the oscillator tune voltage (the VCO tune voltage) through the DAC 258. Because the AFC 244 is implemented in the digital domain, a loop bandwidth as low as 40 Hz can be achieved without external components. Such a small bandwidth in the AFC circuit 244 is desirable to prevent any significant attenuation of the low frequency audio signals modulated on the FM signal.

Further, smooth transient-free switching between the synthesizer circuit operation and the AFC circuit operation is provided by the switches 248 and 272. When the synthesizer circuit tuning is complete, the oscillator control value provided to the DAC 258 is stored in the register 276 in digital format. When the AFC circuit 250 is enabled, the value in the register 276 is then added to the AFC control value, which is also in digital format, by the adder 254 to develop the combined local oscillator control signal. The transition is transient-free and does not add noise.

After the LO frequency is locked to the desired frequency, $f_{LO}$, through AFC tuning, the AFC circuit 244 remains active, so that the LO frequency remains locked during the radio reception.

In order for the AFC circuit 244 to work properly, the LO frequency is preferably set reasonably close to the target value prior to the AFC tuning. Additionally, the LO frequency should not drift too far from the target value at any time during the AFC tuning and radio reception, otherwise the LO may cause the receiver to erroneously lock to a nearby undesired channel. This is usually not an issue under normal situations. However, there exist some special situations where the LO may drift far from the desired frequency and cause the receiver to lock to an undesired channel. One such situation is when the RF input signal on connection 136 is momentarily lost, during which the AFC circuit 244 loses its input and the LO frequency can drift far enough that, when the input signal is reacquired, the LO is already locked to an undesired channel and does not recover to the correct frequency.

This drawback of the AFC tuning arises fundamentally because the AFC circuit 244 attempts to set the LO frequency according to the frequency of the RF input, rather than the frequency of the reference frequency source. This drawback is addressed by the LO error correction block 340. The frequency detector 302 is active during both the synthesizer tuning and the AFC tuning. The frequency detector 302 measures the LO frequency error against the 32.768 kHz reference source. When the LO error measured by the LO error correction block 340 exceeds a predetermined threshold, which is supplied over connection 342, the LO error correction block 340 injects an error correction signal into the AFC output via an adder 336, causing a step change in the VCO frequency. The frequency step change initiated by the error correction signal brings the VCO output back to within close proximity of the desired target frequency, allowing the AFC circuit 244 to lock the VCO to the exact target frequency. The error threshold is set large enough so that the output of the LO error correction block 340 stays at zero under normal conditions. The point of injection of the LO error correction signal is shown in FIG. 3 to be before connection 246, but this need not be the case. The error correction signal can be applied anywhere between connection 328 and the VCO 212, or can be applied within the accumulator 326. The LO error correction performed by the LO error correction block 340 ensures that the LO frequency does not drift too far under any circumstances, thus preventing the possibility that the AFC circuit 244 will lock to an undesired channel.

It should be mentioned that the only analog blocks are the DAC 258 and the oscillator 212, which are shared between the synthesizer circuit 240 and the AFC circuit 250. Additionally, the bandwidth of the DAC 258 can be set very low, as the frequency drift of the oscillator 212 is very slow in practice. Therefore, the DAC 258 can be implemented with low power and high resolution. In an embodiment, the DAC 258 is implemented using a sigma-delta DAC.

Figure 4:
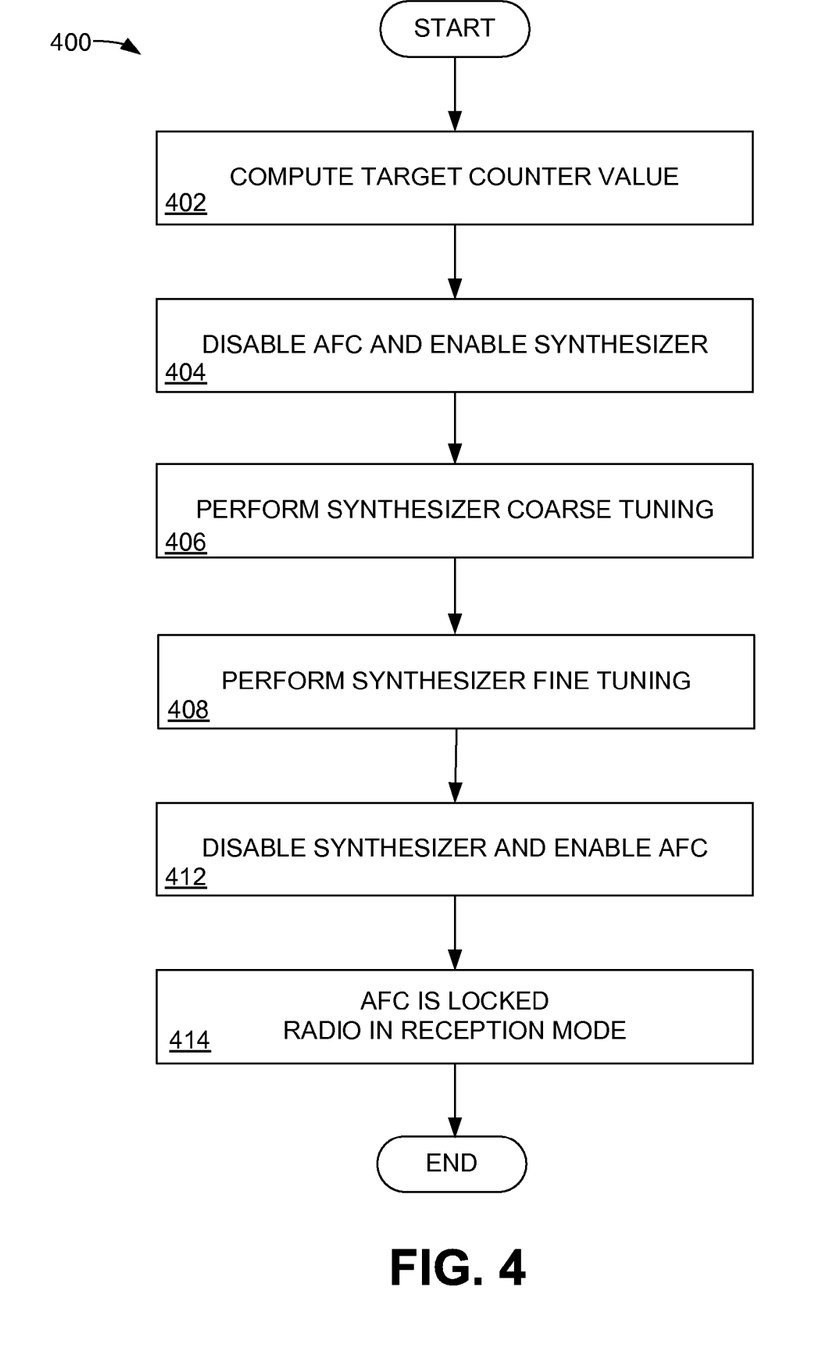
FIG. 4 is a flow chart describing the operation of an embodiment of a method for tuning a radio receiver.

FIG. 4 is a flow chart 400 describing the operation of an embodiment of the method for tuning a radio receiver. The blocks in the flowchart can be performed in or out of the order shown by the elements described above, or can be performed by different elements.

In block 402, the counter target value is computed based on the desired LO frequency. In block 404, the synthesizer circuit 240 is enabled via the switch 272, while the AFC circuit is disabled via the switch 248.

In block 406, the synthesizer coarse tuning element 314 adjusts the VCO frequency towards the desired frequency.

In block 408, following synthesizer coarse tuning, the synthesizer fine tuning further sets the VCO frequency in closer proximity to the desired frequency.

In block 412, and after the synthesizer 266 tunes to an LO frequency in close proximity to the desired LO frequency, the switch 272 is controlled to disable the synthesizer circuit 240, while the switch 248 is controlled to enable the AFC circuit 250. The AFC element 244 then uses the IF frequency error signal on connection 236 to precisely tune to the desired LO frequency.

In block 414, the AFC circuit 244 is locked and the radio is in reception mode. The AFC circuit 244 continues its operation to maintain VCO lock. The frequency detector 302 continuously monitors the LO frequency error according to the reference clock, and the LO correction block 340 injects correction signal to the AFC circuit 244 should the LO error exceeds a predetermined threshold.

The system and method for tuning a radio receiver substantially eliminates components that are external to the radio 200. This is possible, in part, because the loop filters in the synthesizer and the AFC loop are implemented in the digital domain. This advantage is significant in the handset applications, where low cost and small area are highly desirable.

Further, the synthesizer in most previous solutions require a phase and frequency detector (PFD), a charge pump, and loop filters to achieve both phase and frequency locking. Many previous solutions also require an additional frequency detector for coarse calibration of the oscillator. In an embodiment of the system and method for tuning a radio receiver, the synthesizer 244 includes a frequency detector 302 and a digital accumulator 306. The frequency detector 302 is used for both coarse tune and fine tune. The digital accumulator 306 eliminates large capacitors that would otherwise require the use of external components. Because the LO frequency provided by the oscillator 212 is ultimately set by the AFC circuit 250, the resolution of the synthesizer circuit 240 is relaxed, thereby simplifying its implementation.

Further still, switching from the synthesizer circuit 240 to the AFC circuit 250 is free of transient and analog noise. Additionally, the summation of the first and second oscillator control signals from the synthesizer circuit 240 and the AFC circuit 250 is performed in the digital domain, thus eliminating the need for a noise-prone analog adder which consumes additional power.

Further still, the frequency detector 302 continuously monitors the VCO frequency error according to the reference frequency during AFC circuit operation. The LO error correction circuit 340 injects a correction step into the AFC loop to re-center the LO frequency should it drift too far, thus preventing the AFC loop from locking to an undesired channel.

The system and method for tuning a radio receiver can also be implemented using complementary metal oxide semiconductor (CMOS) technology, taking advantage of scaling benefits, and it is well suited to digital radio architectures.

While various embodiments of the invention have been described, it will be apparent to those of ordinary skill in the art that many more embodiments and implementations are possible that are within the scope of the invention. For example, the invention is not limited to a specific type of radio receiver. Embodiments of the invention are applicable to different types of radio receivers and are applicable to any receiver that tunes to an RF signal.

What is claimed is:

1. A system for tuning a radio receiver, comprising:
  a radio receiver configured to provide a downconverted digital error signal;
  a digital synthesizer circuit configured to generate a first local oscillator control signal, the digital synthesizer circuit including a counter configured to receive a reference frequency and an output of a local oscillator, a digital accumulator configured to receive and accumulate the output of the counter, and a synthesizer scaling element configured to receive the accumulated output;
  a digital automatic frequency control (AFC) circuit configured to generate a second local oscillator control signal corresponding to a desired local oscillator frequency, the digital synthesizer circuit being enabled to generate the first local oscillator control signal when the digital AFC circuit is disabled, the digital AFC circuit being enabled to generate the second local oscillator control signal when the digital synthesizer circuit is disabled, the first local oscillator control signal corresponding to an estimate of the desired local oscillator frequency; and
  a combining element combining the first local oscillator control signal and the second local oscillator control signal to form a combined local oscillator control signal.

2. The system of claim 1 further comprising a register configured to receive an output of the synthesizer scaling element, the register configured to store the first local oscillator control signal for use by the digital AFC circuit when the digital AFC circuit becomes enabled.

3. The system of claim 1 in which the digital AFC circuit further comprises:
  a digital accumulator configured to receive and store a digital error signal; and
  an AFC circuit scaling element configured to receive the accumulated output of the digital accumulator and configured to develop a time constant for the digital AFC circuit.

4. The system of claim 3 in which the digital AFC circuit uses the digital error signal to generate the second local oscillator control signal.

5. The system of claim 1 further comprising a local oscillator correction element configured to adjust an output of the digital AFC circuit based on a frequency of an oscillator.

6. A portable transceiver having a system for tuning a radio receiver, comprising:
  a transmitter operatively coupled to a receiver;
  a radio receiver configured to provide a downconverted digital error signal;
  a digital synthesizer circuit configured to generate a first local oscillator control signal, the digital synthesizer including a counter configured to receive a reference frequency and an output of a local oscillator, a digital accumulator configured to receive and accumulate the output of the counter, and a synthesizer scaling element configured to receive the accumulated output;
  a digital automatic frequency control (AFC) circuit configured to generate a second local oscillator control signal corresponding to a desired local oscillator frequency, the digital synthesizer circuit is being enabled to generate the first local oscillator control signal when the digital AFC circuit is disabled, the digital AFC circuit being enabled to generate the second local oscillator control signal when the digital synthesizer circuit is disabled, the first local oscillator control signal corresponding to an estimate of the desired local oscillator frequency; and a combining element combining the first local oscillator control signal and the second local oscillator control signal to form a combined local oscillator control signal.

7. The transceiver of claim 6 further comprising a register configured to receive an output of the synthesizer scaling element, the register configured to store the first local oscillator control signal for use by the digital AFC circuit when the digital AFC circuit becomes enabled.

8. The transceiver of claim 6 in which the digital AFC circuit further comprises:
   a digital accumulator configured to receive and store a digital error signal; and
   an AFC circuit scaling element configured to receive the accumulated output of the digital accumulator and configured to develop a time constant for the digital AFC circuit.

9. The transceiver of claim 8 in which the digital AFC circuit uses the digital error signal to generate the second local oscillator control signal.

10. A method for tuning a radio receiver, comprising:
   providing a downconverted digital error signal;
   generating a first local oscillator control signal corresponding to a desired local oscillator frequency when a second local oscillator control signal is disabled, generating the first local oscillator including providing a signal representing a frequency difference between a reference frequency and the output of a local oscillator, providing the signal representing a frequency difference between a reference frequency and the output of a local oscillator to a digital accumulator, storing in the digital accumulator the signal representing a frequency difference between a reference frequency and the output of a local oscillator, and scaling the stored signal to develop a time constant for the first local oscillator control signal;
   generating the second local oscillator control signal when the first local oscillator control signal is disabled; and
   combining the first local oscillator control signal and the second local oscillator control signal to form a combined local oscillator control signal.

11. The method of claim 10 further comprising storing the first local oscillator control signal to combine with the second local oscillator control signal.

12. The method of claim 10 in which generating the second local oscillator control signal further comprises:
   storing a digital error signal; and
   scaling the stored digital error signal to develop a time constant for the second local oscillator control signal.

13. The method of claim 12 further comprising using the digital error signal to generate the second local oscillator control signal.

14. The method of claim 10 further comprising adjusting an output of a digital AFC circuit based on a frequency of an oscillator.

15. The system of claim 1 wherein the digital synthesizer circuit further includes a coarse tuning element configured to receive the output of the counter.

16. The system of claim 15 wherein the counter is configured to provide a signal representing a frequency difference between the reference frequency and the output of a local oscillator.

17. The system of claim 16 wherein the synthesizer scaling element is further configured to develop a time constant for the digital synthesizer circuit.

18. The portable transceiver of claim 6 wherein the digital synthesizer further includes a coarse tuning element configured to receive the output of the counter.

19. The portable transceiver of claim 18 wherein the counter is configured to provide a signal representing a frequency difference between the reference frequency and the output of a local oscillator.

20. The portable transceiver of claim 19 wherein the synthesizer scaling element is further configured to develop a time constant for the digital synthesizer circuit.

21. The method of claim 10 wherein generating the first local oscillator further includes providing the signal representing a frequency difference between a reference frequency and the output of a local oscillator to a coarse tuning element.

* * * * *